United States Patent [19]

Martell

[11] 3,758,540

[45] Sept. 11, 1973

[54] FERRIC CHELATES OF N-(2-HYDROXYBENZYL) SUBSTITUTED AMINOPOLY CARBOXYLIC ACIDS

[76] Inventor: Arthur E. Martell, 1211 Orr St., College Station, Tex. 77840

[22] Filed: Oct. 9, 1970

[21] Appl. No.: 79,695

Related U.S. Application Data

[63] Continuation-in-part of Ser. No. 705,005, Feb. 13, 1968, Pat. No. 3,632,637.

[52] U.S. Cl. ............... 260/439 R, 71/1, 260/429 J, 260/519 E
[51] Int. Cl. ..................... C07f 15/02, C07c 101/72
[58] Field of Search.................... 260/429 F, 439 R, 260/519 E

[56] References Cited
UNITED STATES PATENTS

| | | | |
|---|---|---|---|
| 3,110,679 | 11/1963 | Rubin | 252/152 |
| 2,624,760 | 1/1953 | Bersworth | 260/519 |
| 2,717,263 | 9/1955 | McKinney et al. | 260/471 R |
| 3,038,793 | 6/1962 | Kroll et al. | 71/1 |

OTHER PUBLICATIONS

L'Eplattenier et al., J. Am. Chem. Soc. 89 (1967), p. 837–843.

Primary Examiner—Daniel E. Wyman
Assistant Examiner—A. P. Demers
Attorney—Thomas B. Graham

[57] ABSTRACT

Soluble iron (III) chelates of N-(2-hydroxybenzyl) substituted aminopolycarboxylic acid ligands useful in plant nutrition as a source of iron.

3 Claims, No Drawings

FERRIC CHELATES OF N-(2-HYDROXYBENZYL) SUBSTITUTED AMINOPOLY CARBOXYLIC ACIDS

RELATED APPLICATIONS

This application is a continuation-in-part of my co-pending application Ser. No. 705,005, now U.S. Pat. No. 3,632,637, filed Feb. 13, 1968.

BACKGROUND OF THE INVENTION

Iron chelates are utilized in a variety of applications, notably as a source of iron in plant nutrition. The iron chelates that are conventionally employed for plant nutrition, such as the ferric chelates of ethylenediaminetetraacetic acid (EDTA), N-hydroxyethyl-N,N',N'-ethylenediaminetriacetic acid (HEDTA), and the like, have been found to be unstable in alkaline soils. Thus, these materials quickly break down in the soil, depositing the iron as ferric hydroxide or ferric oxide in which form the iron cannot be absorbed by the root system of the plant.

A further consideration in the use of iron chelates in plant nutrition stems from the fact that the chelate is absorbed intact and thus is present in the plant tissues. It is essential, therefore, that the chelate be devoid of phytotoxic properties.

U.S. Pat. No. 3,038,793 discloses ferric chelates of ethylenediaminediacetic acids containing substituted phenolic groups which are proposed as a solution to the difficulties encountered with the prior art chelates. While these materials have shown to some advantage, the required presence of alkyl substituents on the phenolic groups decreases the solubility and stability of these materials and, correspondingly, their effectiveness for binding iron.

SUMMARY OF THE INVENTION

It is the primary object of this invention to provide iron chelate compounds which exhibit excellent stability under alkaline conditions.

It is a further object to utilize these chelates as a source of iron for plants growing in alkaline soils without encountering the stability and phytotoxic difficulties encountered with prior art materials.

Various other objects and advantages of this invention will become apparent from the following detailed description thereof.

It has now been found that the soluble iron chelates of the N-(2-hydroxybenzyl) substituted aminopolycarboxylic acids, as defined hereinafter, are more stable in solution than those of any other chelating agent now known. Because of this special and unusual stability, these iron chelate compounds have important uses and applications, wherever a soluble, highly stable iron compound is needed. The most important use that these metal chelates have is the nutrition of plants in soils that are highly alkaline, or contain high ion-exchange capacity in an alkaline medium. In contrast with the prior art products which exhibit instability in alkaline environment, the iron (III) chelates of this invention exhibit exceptionally high stability such that they can remain in contact with alkaline soil indefinitely without losing or exchanging their iron. In fact, they can be boiled with suspensions of calcium carbonate, magnesium carbonate, or in solutions of trisodium phosphate, sodium carbonate, or even sodium hydroxide without decomposing. It should also be noted that the novel chelates of this invention are totally devoid of phytotoxic properties, thereby further enhancing their effectiveness in correcting iron deficiencies occuring in plants grown in alkaline soils.

DESCRIPTION OF THE PREFERRED EMBODIMENTS

The ligands which are applicable for use in this invention correspond to the formula

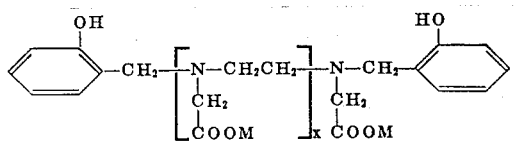

wherein $x = 0,1,2$ and M is independently selected from the group consisting of $H^+$, $Na^+$, $K^+$, $NH_4^+$.

Specific compounds which correspond to the formula include: N,N-bis-2-hydroxybenzyl glycine; N,N'-bis-2-hydroxybenzyl-N,N'-ethylenediaminediacetic acid; and N,N''-bis-2-hydroxybenzyl-N,N',N''-diethylenetriaminetriacetic acid.

Methods for preparing these ligands have been previously described in my copending application Ser. No. 705,005, filed Feb. 13, 1968 and in the article by L'Eplattenier, Murase and Martell appearing in the Journal of the American Chemical Society, 89, 837(1967). In general, the method consists of (1) shielding the phenolic group so that it will not undergo undesirable side reactions during the condensation with the amine, and (2) substituting the acetic acid groups desired on the amine prior to substitution of the o-hydroxybenzyl group. More particularly, the process involves reacting, at elevated temperatures, an ortho-hydroxybenzyl alcohol with an esterifying agent selected from the group consisting of low molecular weight fatty acids and anhydrides; halogenating the resulting ester compound by reacting said ester with a hydrogen halide solution; and reacting the resulting ortho-acyloxybenzyl halide with an amino acetic acid compound in the presence of an alkaline reagent to condense the amino hydrogen with said halide group and, thereafter, to remove the esterifying acid from the esterified phenolic group.

The ferric chelates of these ligands can be synthesized in several ways. The preferred method, which yields the metal chelate in high purity, is to combine the acid form of the ligand with the appropriate amount of the metal hydroxide, and with an alkali metal hydroxide if required. More specifically, a solution of ferric salt in water is alkalized with, for example, ammonia to provide a volatile base, whereupon the precipitate of hydroxide is filtered off, washed and while wet, the hydroxide precipitate is dissolved in the acid form of chelating agent. In this form the chelate product is an aqueous solution of the heavy metal chelate. It can be evaporated to dryness to produce the pure chelate.

In order to be most reactive, the ferric hydroxide in the above described procedure should be freshly precipitated and not subjected to heat. For high purity of product, the ferric hydroxide should be separated from alkali metal salts, or other soluble salts. This may be accomplished by washing the suspension with distilled water. The final product is then crystallized from the filtered solution by evaporation of solvent.

An alternative method of forming the heavy metal chelate is to prepare an aqueous solution of the ferric salt, such as nitrate or the chloride, react it with an equimolar amount of the acid form of the chelating agent, thereby to form a ferric chelate, evaporate to dryness, or alkalize the material with ammonium hydroxide, evaporate to dryness.

The third version or method of making the heavy metal chelate is to prepare the aqueous solution of the ferric salt of a mineral acid, react it with an equimolar amount of the alkali metal salt of the chelating agent, thereby to form the chelate in solution, evaporate to dryness and generally accept the chelate with a certain amount of the salt or by-product of reaction therein. The salt or by-product is usually inert and does not influence the stability of the iron chelate. The formation of such inert by-products also does not adversely influence the yields obtained.

A quantitative method of making chelates is to prepare the solution of ferric salt and literally titrate it into a solution of the chelating agent. The endpoint is indicated by appearance of the ferric hydroxide precipitate. Concentrations are not critical and can be 10 – 50 percent, depending on the solubility of the ferric salt.

The chelate products are identified and characterized by the use of various analytical techniques. In all cases elemental analysis gives results that are within the prescribed limits (within 0.3 percent of %C, and within 0.2 percent for %N). For example, the deep red color exhibited by the ferric chelate in solution allows analysis by means of spectrophotometric analysis on the intensity of the red color.

The nature of the chelating agents and metal chelates is proved by infrared spectral determinations. The infrared spectra shows broad absorption bands in the carbonyl region, as expected, due to the stretching vibrations of the carboxyl carbonyl (in the hydrochlorides), of the carboxylate carbonyl (in the free ligand acid) and of the metal-coordinated carbonyl (in the metal chelates). In all cases, the C—O stretching vibration of the phenolic group, or of the coordinated phenolate ion, is clearly discernable. In the free ligands, the O—H stretch of the phenolic group is also observed in the infrared.

In relating back of the formula of the ligands, it will be seen that the ferric chelates of this invention are such that $Fe^{+3}$ atoms displace partially or completely the M groups and the protons attached to the phenolic type groups.

As previously indicated, the ferric chelates of this invention exhibit exceptionally high stability. Thus, for example, when $x = 0$, and M is Na, in the above depicted formula, the sodium di(o-hydroxybenzyl)-glycinate combines with iron(III) to form a very stable wine-red iron chelate, which has a stability constant of over $10^{20}$, as defined by the following reaction:

$$Fe^{3+} + L^{3-} \rightleftharpoons FeL$$

where $H_3L$ is the chelating agent with $M = H$, and $x = 0$, and where the monosodium salt has the formula $NaH_2L$.

When $x = 1$, and M is Na, the chelating ligand is defined as $Na_2H_2L$, where the H's represent the displaceable protons of the two phenolic groups. In the absence of a chelated metal ion, these two protons do not dissociate in solution until an extremely high pH is attained (pH 12–13). In the presence of the $Fe^{3+}$ ion, however, these two phenolic groups become displaced by the ferric ion, and a wine-red metal chelate is formed in very acidic solution:

$$Fe^{3+} + H_2L^{2-} \rightleftharpoons FeL^- + 2H^+$$

This iron chelate is extremely stable. In fact this is the most stable iron (III) chelate for which a precise stability constant has been published in the literature. The stability constant is given in terms of the following reaction.

$$Fe^{3+} + L^{4-} \rightleftharpoons FeL^- \quad K = ([FeL^-]/[Fe^{3+}][L^{4-}]) = 10^{39.7}$$

The resulting compound is very stable and quite inert in aqueous solution.

As a result of their high stability, the chelates of the present invention are especially well-suited for supplying iron to plants in a form that cannot be precipitated out by soil constituents.

In addition to use for plant nutrition, the highly stable iron chelates of this invention may be employed in any other applications for which a highly stable iron (III) compound is needed. Thus, the radioactive iron chelate (containing $Fe^{59}$) of N,N'-bis-2-hydroxybenzyl-N,N'-ethylenediaminediacetic acid may be used as a tracer for the investigation of the flow of underground waters. Because of its high stability and inertness to exchange reactions, it will persist for a long time and therefore be more useful than most reagents available for this purpose. Also, this iron chelate is a combustion catalyst, preventing the formation of smoke and incompletely oxidized products. This use is especially pertinent in the disposal by combustion of alkaline organic wastes. The high stability of the chelate prevents it from decomposing prior to its becoming incorporated into the flame.

The following examples will further illustrate the embodiments of this invention.

EXAMPLE I — Fe(III)chelate of N,N-bis-2-hydroxybenzylglycine(hydrate)

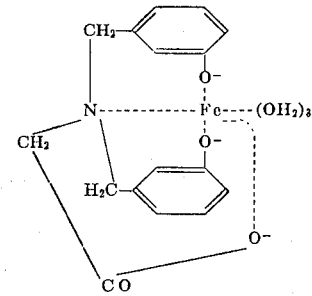

A sample of ferric chloride containing 55.8 g. of iron was dissolved in about a liter of water and precipitated by the addition of excess ammonia, with warming to accelerate the settling out of the ferric hydroxide. The precipitate was washed by decantation three times, whereupon 287 grams of N,N-bis-2-hydroxybenzylglycine were added. The reaction mixture was heated to 100°C., stirred and refluxed slowly for 2 hours. The mixture was then stirred slowly at 90°C. for 10 hours to allow the solid-solid reaction to go to completion. The resulting deep red crystals were filtered hot.

A second batch of dark red crystals may be obtained by allowing the mother liquor to cool, and may be further increased in amount by evaporation to one half its volume. The combined batches of product weighed 375 grams. As the trihydrate, the yield was 95 percent of the theoretical amount. Its composition was verified by elemental anaylsis and was found to be in agreement with the above noted formula.

EXAMPLE II — Fe(III) chelate of N,N'-bis-2-hydroxybenzyl-N,N'-ethylenediaminediacetic acid

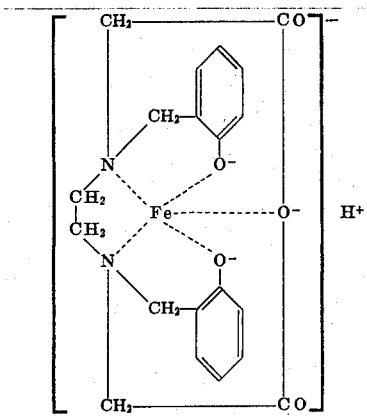

A sample of basic ferric carbonate containing 28.0 g. of iron was suspended in an aqueous solution containing 194 grams of N,N'-bishydroxybenzyl-N, N'-ethylenediaminediacetic acid. The reaction mixture was warmed and stirred at near 100°C., and after all effervescence had ceased, was warmed at the same temperature for an additional hour. The iron chelate was isolated in high purity by evaporation of the water to dryness. The deep, dark wine-red crystals analyzed for the anhydrous material, corresponding to the above formula. The product was then recrystallized from hot water.

The stability constant of the above prepared iron (III) chelate was determined to be 500,000 times greater than that of the next most stable chelate known, i.e. the Fe(III) chelate of ethylenebis(o-hydroxyphenyl glycine).

EXAMPLE III — Fe(III) chelate of N,N''-bis-2-hydroxybenzyl-N,N'N''-dienthylenetriaminetriacetic acid

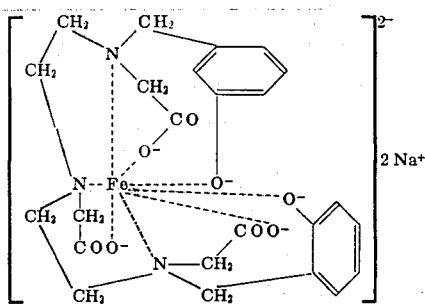

To an aqueous solution containing 278 g. of the disodium salt of N,N''-bis-2-hydroxybenzyl-N, N', N''-diethylenetriaminetriacetic acid was added solid basid ferric acetate containing 28.0 grams of iron. The reaction mixture was stirred and warmed until all solid material was dissolved, and the heating was continued for one additional hour. The product was isolated as the dihydrate by evaporation to a small volume followed by slow addition of methanol. The material obtained directly from the reaction mixture, a red amorphous solid, analyzed as the dihydrate: $Na_2 C_{24}H_{30}O_{10}N_3$. The yield of 290 g. represented 90 percent of the theoretical amount.

Summarizing, it is thus seen that this invention provides a unique group of exceptionally stable ferric chelates which are well suited for use as sources of iron in agriculture.

Variations may be made in procedures, proportions and materials without departing from the scope of the invention as defined by the following claims.

What is claimed is:
1. Fe(III) chelate of N,N-bis-2-hydorxybenzyl glycine.
2. Fe(III) chelate of N,N''-bis-2-hydroxybenzyl-N,N',N''-diethylenetriaminetriacetic acid.
3. The disodium salt of the chelate of claim 2.

* * * * *